United States Patent [19]
Tsuji et al.

[11] Patent Number: 5,887,109
[45] Date of Patent: Mar. 23, 1999

[54] RECORDING APPARATUS CAPABLE OF SELECTING A CATV BROADCAST WITHOUT OPERATING A CATV DECORDER AND METHOD THEREFOR

[75] Inventors: Shigehiro Tsuji, Itami; Masaharu Hayakawa, Nagaokakyo, both of Japan

[73] Assignee: Mitsubishi Denki Kabushiki Kaisha, Tokyo, Japan

[21] Appl. No.: 886,124

[22] Filed: Jun. 30, 1997

Related U.S. Application Data

[63] Continuation of Ser. No. 652,164, Mar. 23, 1996, abandoned, which is a continuation of Ser. No. 207,171, Mar. 8, 1994, abandoned.

[30] Foreign Application Priority Data

Apr. 20, 1993 [JP] Japan .................................. 5-093139

[51] Int. Cl.[6] ..................................................... H04N 5/76
[52] U.S. Cl. .............................. 386/46; 348/6; 348/705; 360/61
[58] Field of Search .................................. 348/6, 7, 341, 348/343, 705, 706, 734, 16, 731, 732; 358/335; 360/33.1, 61; 455/3.1, 4.1, 4.2, 6.1, 150.1, 179.1; 386/1, 46; H04N 5/76, 8/268, 7/10

[56] References Cited

U.S. PATENT DOCUMENTS

| | | |
|---|---|---|
| 4,334,242 | 6/1982 | Mangold . |
| 4,631,601 | 12/1986 | Brugliera et al. . |
| 4,841,368 | 6/1989 | Rumbolt et al. . |
| 4,843,482 | 6/1989 | Hegendorfer . |
| 5,031,045 | 7/1991 | Kawasaki ..................... 348/6 |
| 5,065,235 | 11/1991 | Iijima . |
| 5,123,046 | 6/1992 | Levine . |
| 5,237,420 | 8/1993 | Hayashi ................... 348/731 |
| 5,251,035 | 10/1993 | Kurita et al. ............. 348/731 |
| 5,297,204 | 3/1994 | Levine ..................... 348/734 |
| 5,303,063 | 4/1994 | Kim et al. ................ 358/335 |
| 5,343,251 | 8/1994 | Nafek ....................... 358/335 |
| 5,365,282 | 11/1994 | Levine ..................... 358/335 |
| 5,373,330 | 12/1994 | Levine ..................... 358/335 |
| 5,414,756 | 5/1995 | Levine ......................... 348/6 |
| 5,420,647 | 5/1995 | Levine ..................... 358/335 |

*Primary Examiner*—Thai Tran

[57] ABSTRACT

A recording apparatus includes a tuner which receives CATV signals and selects a TV signal therefrom. The selected TV signal is output via an output terminal to decoder in a cable box, for instance. An input terminal of the recording apparatus receives the decoder output. Both the selected TV signal and the input on from the input terminal are sent to a switching unit. The switching unit selects the input from the input terminal when input signals are present; otherwise the switching unit selects the select TV signal. The switching may be controlled manually or by a detection circuit. The detection circuit detects the presence of input signals at the input terminal. A recording unit records the output from the switching unit.

31 Claims, 5 Drawing Sheets

RECORDING APPARATUS CAPABLE OF SELECTING A CATV BROADCAST WITHOUT OPERATING A CATV DECORDER AND METHOD THEREFOR

This application is a continuation of application Ser. No. 08/652,164 filed on May 23, 1996, now abandoned, which is a continuation of Ser. No. 08/207,171 filed on Mar. 8, 1994, now abandoned.

BACKGROUND OF THE INVENTION

1. Field of the Invention

The present invention relates to a recording apparatus capable of recording CATV (Cable Television) signals.

2. Description of Related Art

In the United States of America, CATV broadcasts are already popular, and CATV broadcasts are recorded using magnetic recording apparatus such as a Video Cassette Recorder (hereinafter referred to as VCR). Some of CATV broadcasts are pay TV broadcasts, and signals of these pay TV are scrambled. To receive and record such signals on a TV receiver, it is required to connect a VCR to a cable box which is a CATV tuner equipped with a scramble decoder to decode the scramble of the signals.

FIG. 1 is a block diagram showing the configuration of a conventional VCR and a cable box to record a CATV broadcast. In the figure, 52 denotes a cable box. A cable from a distributor for CATV not shown in the figure is connected to the cable box 52, and RF signals of CATV are inputted to the cable box 52. The cable box 52 is a CATV tuner equipped with a scramble decoder to select a CATV broadcast channel and decode the scramble of signals.

With an operation by a user of a channel selecting operation unit installed on the cable box 52 or with application by the user of remote-control signals to the channel selecting operation unit, a desired channel is selected out of the input CATV signal channels. As to scrambled signals, the scramble is decoded, and signals of a selected channel are outputted in 3 channels or 4 channels of RF. RF signals from the cable box 52 are inputted to the tuner 53 installed in the VCR 51 via input terminal 58.

In the tuner 53, control signals to receive the channel of the signals outputted from the cable box 52, namely 3 channels or 4 channels, are inputted from the channel selection circuit 57. The signals received by the tuner 53 are inputted to the signal processing circuit 54 as IF signals, where video signals and audio signals are separated and output.

These signals are designed to be inputted to the converter 55, converted to RF signals of the 3 channels or 4 channels of RF, outputted to a TV receiver and given to the recording head 66 so that these signals are recorded on a tape.

As described above, the conventional VCR selects a CATV broadcast channel by the cable box 52. Therefore, when a user wants a broadcast of a different channel while seeing and recording a CATV broadcast of a certain channel, the user operates the channel selecting operation unit installed on the cable box 52 or gives remote-control signals to the cable box 52 using a remote-control signal transmitter. At that time, the user has to turn ON the VCR operation unit power switch and operate the channel selecting operation unit or the remote-control signal transmitter. The operation of two devices is troublesome.

SUMMARY OF THE INVENTION

One object of the present invention is to solve the above-mentioned problem. It is an object of the invention to provide a recording apparatus capable of selecting a CATV broadcast channel without operating a decoder for CATV.

According to the invention, the recording apparatus is equipped with a tuner to select a TV signal out of inputted TV signals of plural channels and output IF signals, a converter to convert the IF signals to RF signals, an output terminal to output the RF signals to a decoder for CATV, an input terminal to input the signals from said decoder, and a switching unit to selectively change over and give the IF signals from the tuner or the signals from said input terminal to a recording unit.

Further, according to the invention, the recording apparatus is equipped with a first tuner to select a TV signal and output signals to a decoder, an input terminal to input the RF signals from said decoder, a second tuner to output the RF signals from said input terminal after conversion to IF signals, and a switching unit to selectively change over and give the IF signals from the first tuner or the second tuner to a recording unit.

Accordingly, when the decoder for CATV provided with a scramble decoding function is connected, the inputted channel signals are selected and converted to IF signals by the first tuner, converted to RF signals by the converter, and subjected to decoding of the scramble by the decoder. The RF signals thus unscrambled are converted to IF signals by the second tuner, and recorded via the switching unit changed over toward the second tuner side. When the decoder is not connected, the inputted channel signals are selected and converted to IF signals by the first tuner and recorded via the switching unit changed over toward the first tuner side.

In addition, according to the invention, the recording apparatus is equipped with a signal detection circuit to give instructions on changeover of the switching unit according to the result of detection of signals inputted from the input terminal. Accordingly, in the case of no detection of the signals, the switching unit changesover toward the first tuner side automatically. When the signals are detected, the switching unit changesover toward the input terminal side automatically.

Further, according to the invention, the recording apparatus is equipped with a first signal processing circuit and a second signal processing circuit to separate signals from the first tuner and the second tuner into video signals and audio signals, and the first switching unit and the second switching unit to selectively change over video signals and audio signals outputted from the first signal processing circuit or the second signal processing circuit and give respective signals to the recording unit.

As described above, signals outputted from the first tuner and the second tuner are separated into video signals and audio signals. Video signals outputted from the first signal processing circuit or the second signal processing circuit are changed over by the first switching unit, and audio signals outputted from the first signal processing circuit or the second processing circuit are changed over by the second switching unit, depending on non-connection or connection of the decoder. These video and audio signals are recorded by the recording unit and outputted to video and audio signal input terminals of a TV receiver.

Further, according to the invention, the recording unit is equipped with a signal detection circuit to give instructions on changeover of the first switching unit and the second switching unit according to the result of detection of signals inputted from the input terminals. Accordingly, in the case of no detection of RF signals, the switching units change over toward the first tuner side automatically. When RF signals are detected, the switching units change over toward to the second tuner side automatically. In addition, signals outputted from the first tuner and the second tuner are inputted to the first and second signal processing circuits respectively, where video signals and audio signals are separated. Depending on non-connection or connection of the decode, the video signals are changed over by the first switching unit and the audio signals are changed over by the second switching unit, recorded by the recording unit and outputted to the video and audio signal input terminals of a TV receiver.

The above and further objects and features of the invention will more fully be apparent from the following detailed description with accompanying drawings.

DESCRIPTION OF THE PREFERRED EMBODIMENTS

Hereinafter, the invention will be described with reference to the drawings illustrating the embodiments.

Figure 1:
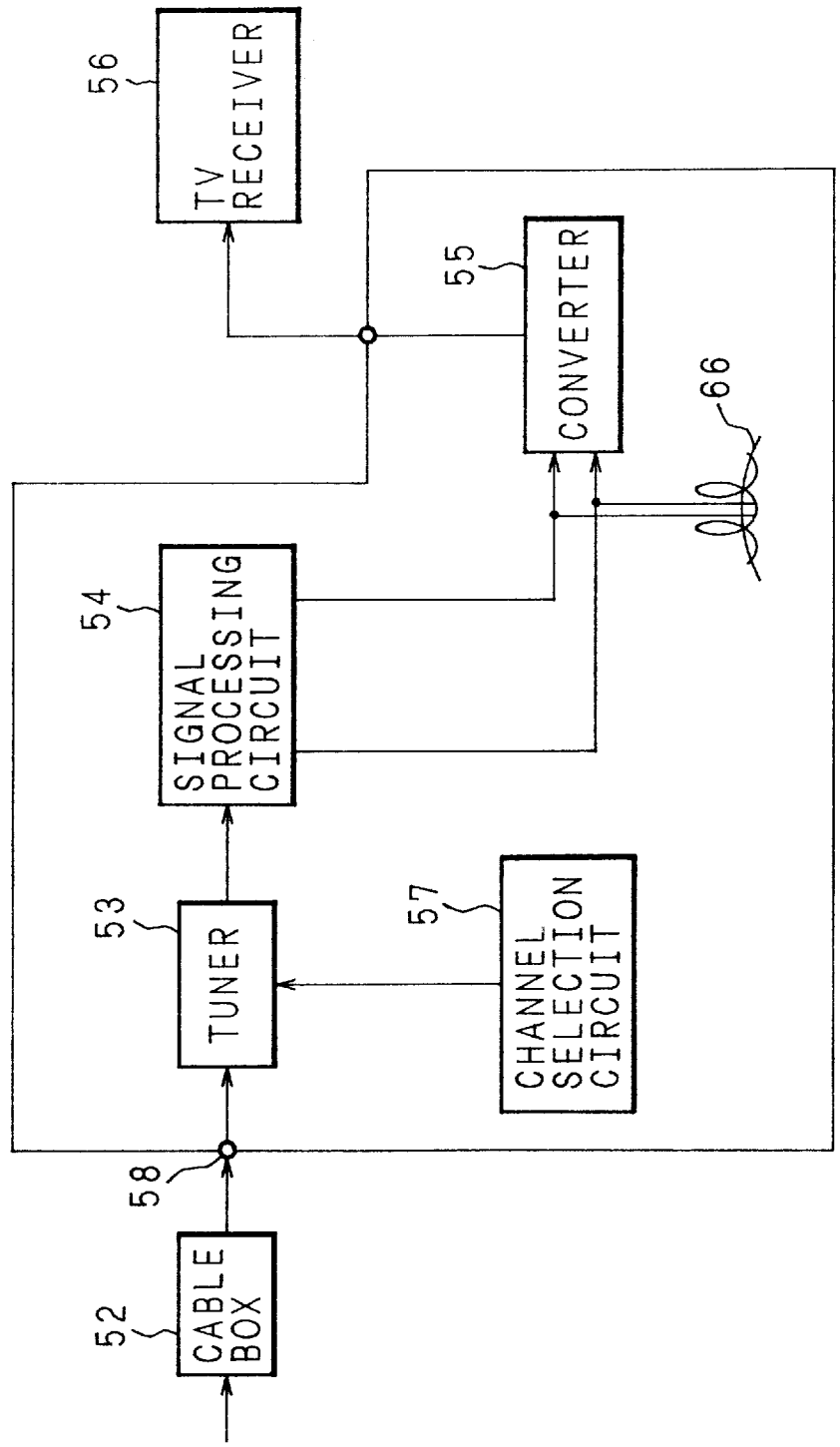
FIG. 1 is a schematic block diagram showing the configuration of a conventional VCR and a cable box.
Figure 2:
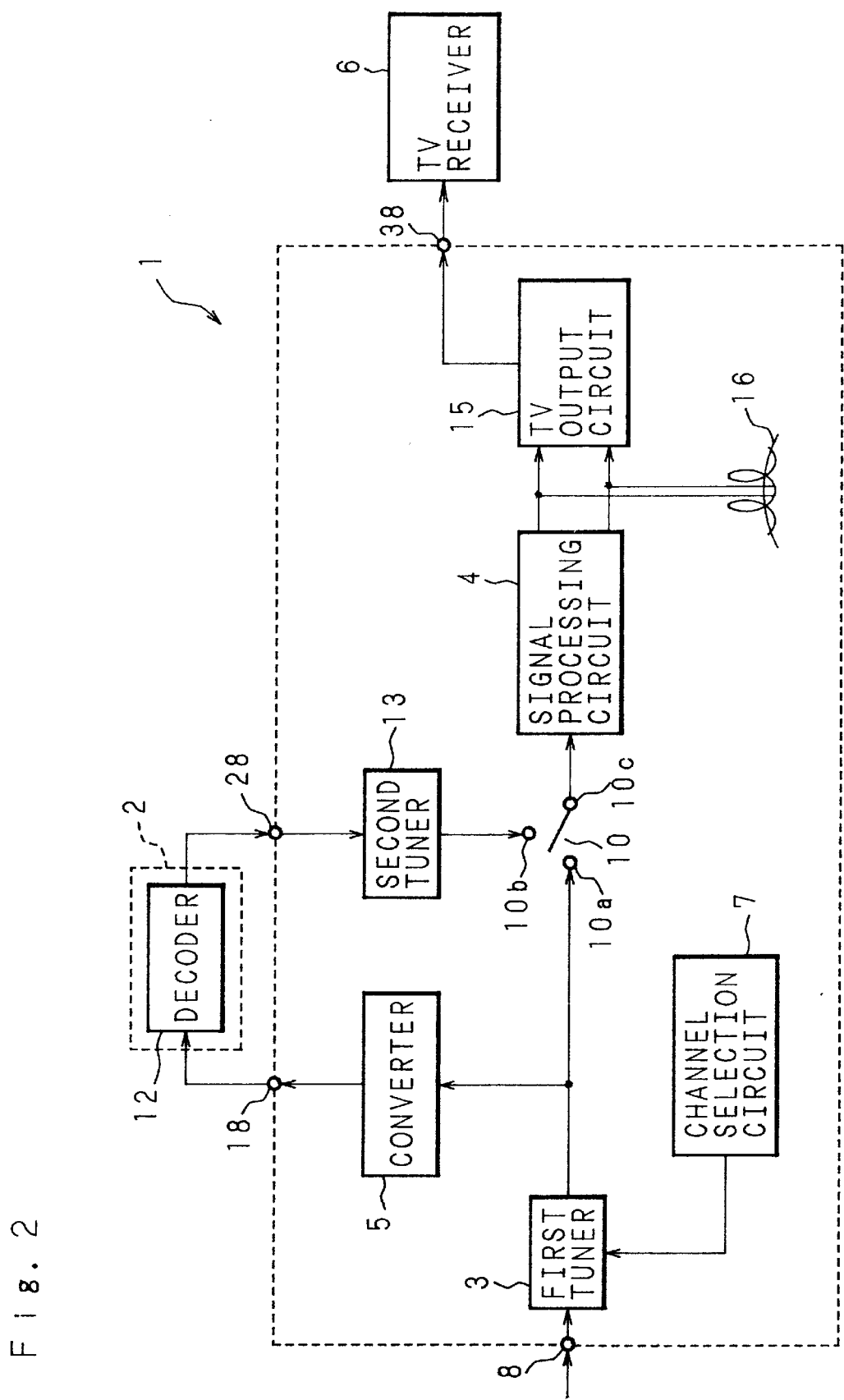
FIG. 2 is a schematic block diagram of a VCR and a cable box which are used in a first embodiment of the invention.

FIG. 2 is a block diagram showing a VCR and a cable box which are used in a first embodiment of the invention. In the figure, 1 denotes a VCR of the invention. RF signals of CATV are inputted from an input terminal 8 of the VCR 1 to a first tuner 3. The first tuner 3 selects a desired channel out of inputted CATV signals of plural channels according to control signals from a channel selection circuit 7. The first tuner 3 converts the signals to IF signals. The IF signals are outputted to a converter 5 and given to a terminal 10a on the changeover side of a switching unit 10.

The signals outputted to the converter 5 are converted to RF signals of fixed channels of 3 channels or 4 channels, and output to a cable box 2 via an output terminal 18 for the cable box. The cable box 2 is a tuner for CATV equipped with a decoder 12 provided with the function to decode the scramble of scrambled signals. The tuning unit for the cable box 2 are set in advance so as to be capable of receiving the fixed channels for the converter 5, namely 3 channels or 4 channels.

The RF signals inputted to the cable box 2 are subjected to decoding of the scramble by the decoder 12 when the signals are scrambled. When the RF signals are not scrambled, the signals are outputted without any processing. The outputted RF signals are inputted to a second tuner 13 via an output terminal 28 for the cable box. The second tuner 13 is so fixed that signals of 3 channels or 4 channels may be inputted. The RF signals inputted to the second tuner 13 are converted to IF signals and given to the terminal 10b on the changeover side of the switching unit 10.

The IF signals given to the terminal 10a or 10b on the changeover side of the switching unit 10 are connected to a terminal 10c on the common side owing to changeover of the switching unit 10, and input to a signal processing circuit 4. Concerning the switching unit 10, connection of the changeover side terminal 10a on the first tuner 3 side or the changeover side terminal 10b on the second tuner 13 side to the common side terminal 10c on the signal processing circuit 4 side is conducted manually depending on non-connection or connection of the cable box 2. Namely, when the cable box 2 is connected, signals are inputted from the second tuner 13. When the cable box 2 is not connected, signals are inputted from the first tuner 3.

The video signals and audio signals are separated from signals inputted to the signal processing circuit 4, inputted to a TV output circuit 15, given to a recording head 16, and recorded on a tape. The signals converted to RF signals by the TV output circuit 15 are outputted to a RF input terminal of a TV receiver 6 via an output terminal 38 for the TV receiver.

When a user, for example, watches a pay CATV broadcast on a TV receiver using the VCR 1 of the above-described configuration, the cable box 2 is connected and the switching unit 10 is changed over toward the changeover side terminal 10b manually. When the user turns ON the power switch and operates the channel selecting operation unit of the VCR 1 to select a desired channel of the CATV broadcast, signals of the selected channel are subjected to decoding of the scramble by the decoder 12, converted to IF signals by the second tuner 13 and inputted to the signal processing circuit 4 via the changeover side terminal 10b and the common side terminal 10c of the switching unit 10. The video signals and the audio signals separated by the circuit are recorded by the recording head 16, converted to RF signals in the TV output circuit 15, and inputted to the RF input terminal of the TV receiver 6 so that images and voices are outputted on the TV receiver 6.

As described above, by connecting the cable 2 to the VCR 1 as shown in the first embodiment, a channel of a CATV broadcast can be selected with the operation of VCR1 only without operating the cable box 2. Further, when the cable box 2 is not connected and ordinary TV signals are inputted to the VCR 1, the switching unit 10 is changed over toward the first tuner side manually, and signals from the first tuner 3 are inputted to the signal processing circuit 4.

Next, the second embodiment of the invention will be explained with reference to the drawing illustrating the embodiment.

Figure 3:
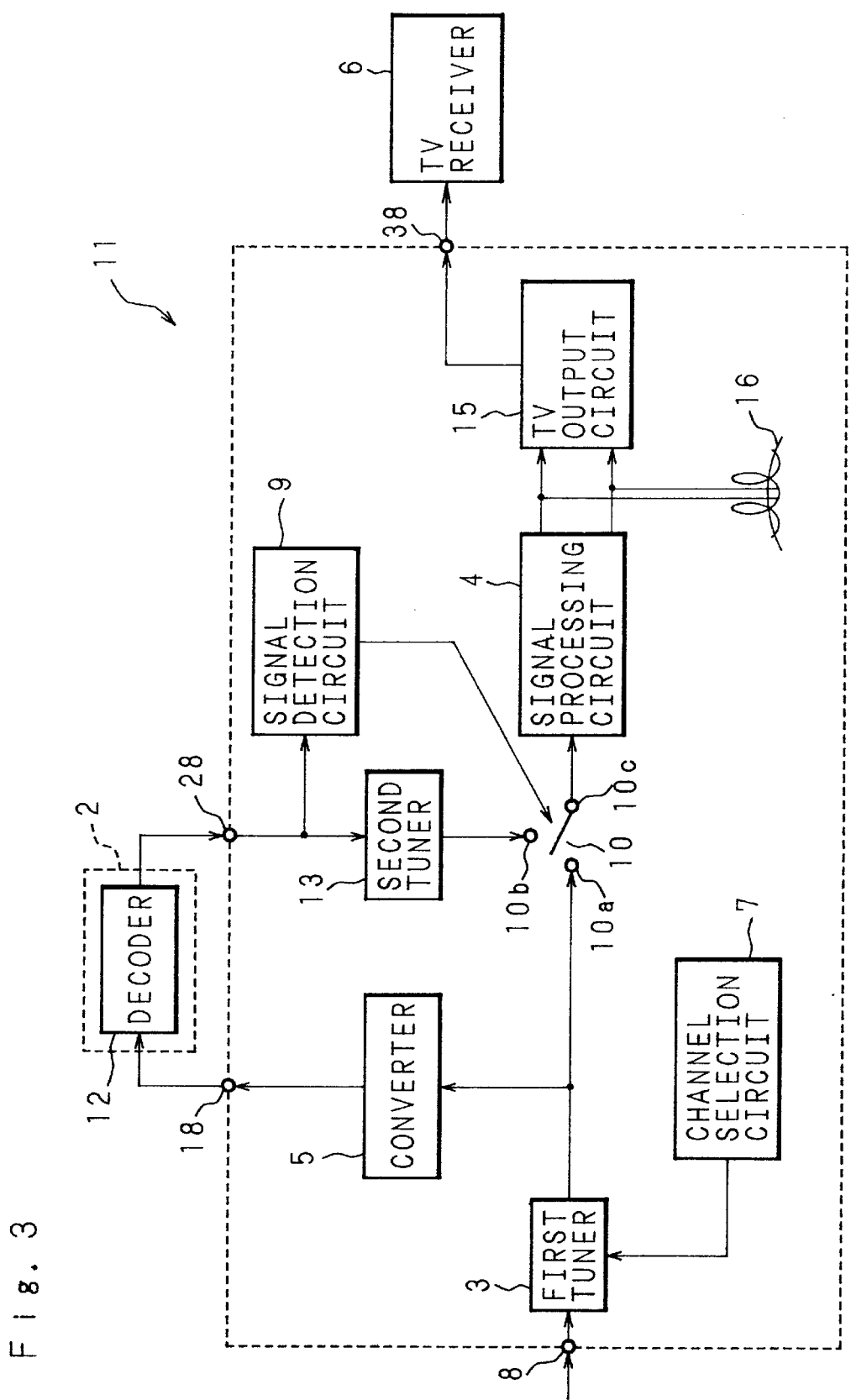
FIG. 3 is a schematic block diagram showing the configuration of a VCR and a cable box which are used in a second embodiment.

FIG. 3 is a block diagram showing the configuration of the VCR and the cable box in a second embodiment. In the figure, 11 denotes a VCR used in the second embodiment. RF signals from the cable box 2 inputted from the output terminal 28 for the cable box are inputted to the second tuner 13 and a signal detection circuit 9. The signal detection circuit 9 is a circuit to output control signals to the switching unit 10 when RF signals are inputted. The switching unit 10 is designed to be changed over toward the terminal 10b side on the changeover side when control signals are inputted, and toward the terminal 10a side on the changeover side when control signals are not inputted. The corresponding portions are denoted by the same reference numerals, and their description is omitted.

When the cable box 2 is connected to the VCR 11 of such a configuration as shown, RF signals are inputted to the signal detection circuit 9, and control signals are outputted from the signal detection circuit 9 to the switching unit 10, to change over the switching unit 10 toward the terminal 10b side on the changeover side. When the cable box 2 is not connected, the signal detection circuit does not detect RF signals, and the switching unit 10 is changed over toward the terminal 10a side on the changeover side. In this way, the switching unit 10 is changed over automatically depending on non-connection or connection of the cable box 2. With the operation of the VCR 11 only, a CATV broadcast channel can be selected without operating the cable box 2 as in the first embodiment described above.

Next, a third embodiment of the invention will be explained with reference to the drawing illustrating the embodiment.

Figure 4:
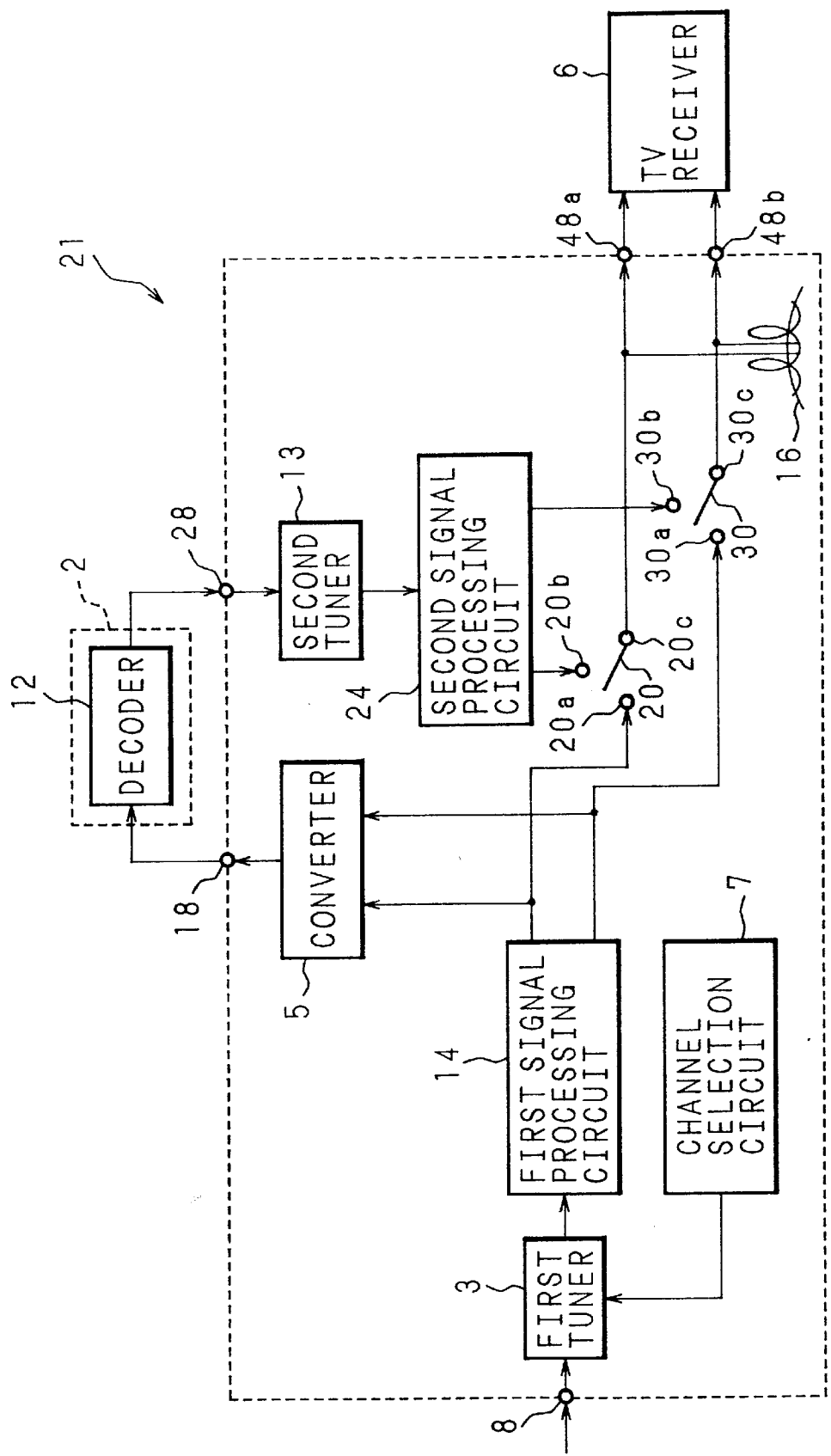
FIG. 4 is a schematic block diagram showing the configuration of a VCR and a cable box which are used in a third embodiment.

FIG. 4 is a block diagram showing the configuration of the VCR and the cable box in the third embodiment. In the figure, 21 denotes a VCR. IF signals selected and outputted by the first tuner 3 are inputted to a first signal processing circuit 14, and video signals and audio signals are separated by the signal processing circuit 14. These video signals and audio signals are outputted to the converter 5, and given to terminals 20a and 30a on the changeover side of switching units 20 and 30 respectively.

The RF signals subjected to decoding of the scramble by the decoder 12 are inputted to the second tuner 13, converted to IF signals and outputted to a second signal processing circuit 24. In the second signal processing circuit 24, IF signals are separated into video signals and audio signals, and the video signals and the audio signals are given to the terminal 20b on the changeover side of the first switching unit 20 and the terminal 30b on the changeover side of the second switching unit 30 respectively.

By changing over the switching unit 20, the video signals from the first signal processing circuit 14 or the second signal processing circuit 24 are connected to the recording head 16 via a terminal 20c on the common side of the switching unit 20, and outputted from a video signal output terminal 48a to the video signal input terminal of the TV receiver 6. Further, by changing over the switching unit 30, the audio signals from the first signal processing circuit 14 or the second signal processing circuit 24 are connected to the recording head 16 via terminal 30c on the common side of the switching unit 30, and outputted from an audio signal output terminal 48b to an audio signal input terminal of the TV receiver. The corresponding portions are denoted by the same numerals, and their description is omitted.

When the cable box 2 is connected to a VCR 21 of such a configuration as shown, the switching units 20 and 30 are manually changed over toward the terminals 20b and 30b, respectively, the video signals and the audio signals separated in the second signal processing circuit 24 are given to the recording head 16 and outputted to the video and audio signal input terminals of the TV receiver 6, respectively. When the cable box 2 is not connected, the switching units 20 and 30 are manually changed over toward the terminal 20b and 30b on the changeover side respectively, the video signals and the audio signals separated by the first signal processing circuit are given to the recording head 16 and outputted to the video and audio signal input terminals of the TV receiver 6, respectively. In this way, with the operation of the VCR 21 only, a CATV broadcast channel can be selected without operating the cable box 2 as in the first embodiment described above.

Next, a fourth embodiment of the invention will be explained with reference to the drawing illustrating the embodiment.

Figure 5:
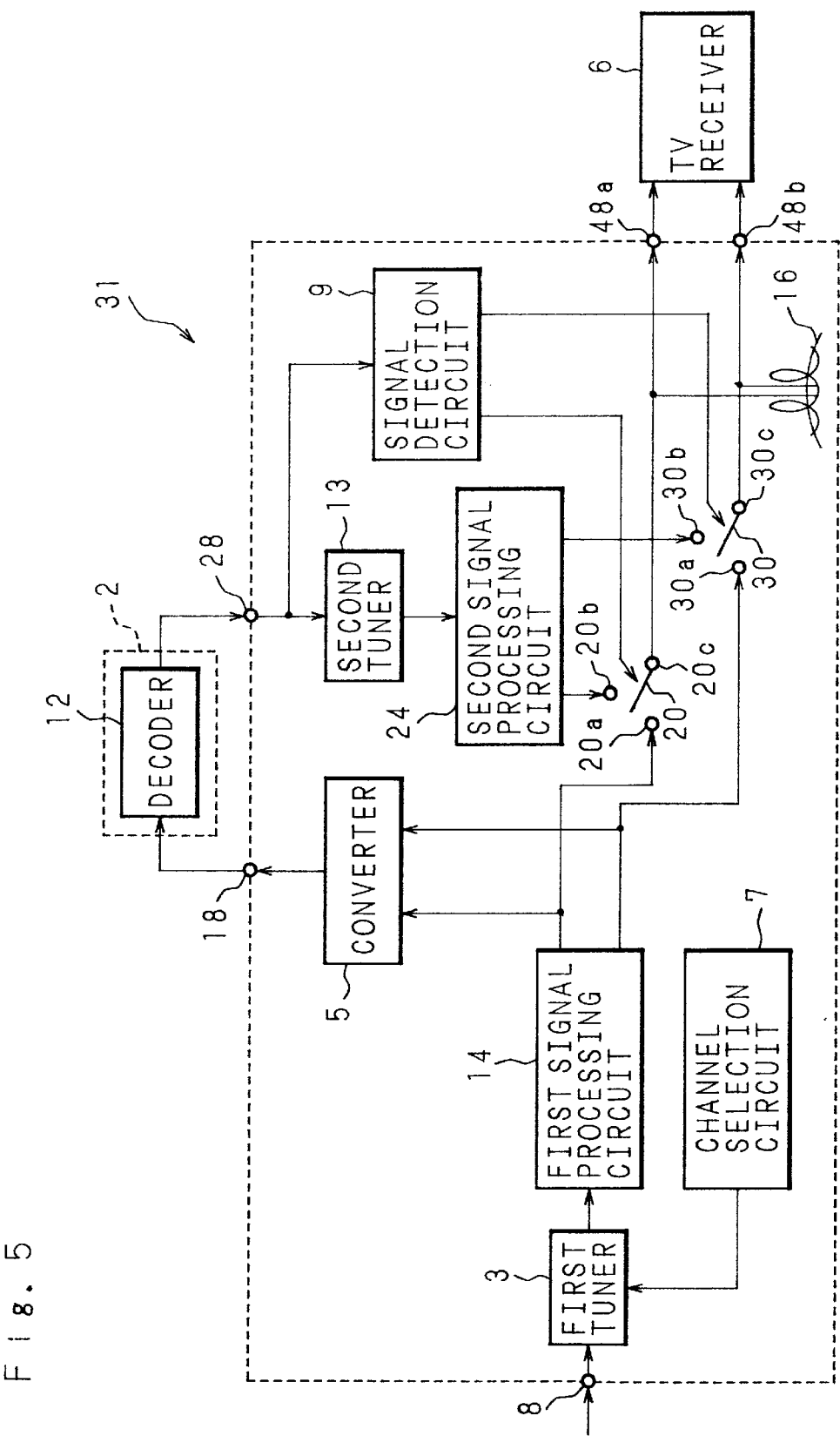
FIG. 5 is a schematic block diagram showing the configuration of a VCR and a cable box which are used in a fourth embodiment.

FIG. 5 is a block diagram showing the configuration of the VCR and the cable box in the fourth embodiment. In the figure, 31 denotes a VCR used in the fourth embodiment.

The RF signals from the cable box 2 output from the input terminal 28 for the cable box are inputted to the second tuner 13 and the signal detection circuit 9. The signal detection circuit 9 is a circuit to output control signals to the first switching unit 20 and the second switching unit 30 when the RF signals are inputted. The first switching unit 20 and the second switching unit 30 are designed to be changed over toward the terminals 20b and 30b on the changeover side, respectively, when control signals are inputted, and toward to terminals 20a and 30a on the changeover side, respectively, when control signals are not inputted. The corresponding portions are denoted by the same reference numerals, and their description is omitted.

When the cable box 2 is connected to the VCR 31 of such a configuration as shown in the embodiment, the RF signals are inputted to the signal detection circuit 9, and control signals are outputted from the signal detection circuit 9 to the switching units 20 and 30 to change over the switching units 20 and 30 toward the terminals 20a and 30a on the changeover side, respectively. When the cable box 2 is not connected, the RF signals are not detected by the signal detection circuit 9, and the first and second switching units 20 and 30 are changed over toward the terminals 20a and 30a on the changeover side, respectively. In this way, the switching units 20 and 30 are changed over automatically depending on non-connection or connection of the cable box 2. With the operation of the VCR 31 only, a CATV broadcast channel can be selected without operating the cable box 2 as in the first embodiment described above.

In the embodiments, a cable box provided with both a conventional channel selecting function and a scramble decoding function is used. The cable box is not restricted to this, and may be a cable box provided with at least the function to decode the scramble of CATV signals.

In the embodiments, the magnetic recording apparatus may be provided with a reproducing function.

The magnetic recording apparatus used in the embodiments is to record TV signals magnetically. The invention is not restricted to this. A recording apparatus which records TV signals optically may be used.

As described above, according to the invention, when a decoder for CATV is connected, inputted CATV broadcasts are selected by the first tuner, and the CATV signals of the selected channel is inputted to the decoder where the scramble of the signals is decoded. And, since these signals are inputted to the magnetic recording apparatus again and recorded by a recording unit, an operation of a cable box is not required and CATV channels can be selected with the use of a recording apparatus only, and therefore, the invention can achieve excellent effects.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A recording apparatus for recording TV signals input from a decoder for CATV provided with a scramble decoding function, comprising:
   a tuner, selecting a TV signal from plural channels of inputted TV signals and outputting first IF signals;
   a converter converting the first IF signals output by said tuner to RF signals;

an output terminal outputting the RF signals to the decoder;

an input terminal receiving decoded RF signals from the decoder;

an IF converter converting the decoded RF signals received by said input terminal to second IF signals;

a switching unit for selectively changing over and outputting the first IF signals from said tuner or the second IF signals from said IF converter to said recording unit; and a recording unit, recording the first IF signals or the second IF signals from said switching unit;

wherein a cable box including the decoder does not perform a channel selection operation.

2. A recording apparatus according to claim 1, further comprising:

a signal detection circuit, detecting the second IF signals from said IF converter, and controlling operation of said switching unit according to the detection.

3. A recording apparatus according to claim 1, wherein said I/F converter is a tuner.

4. A recording apparatus according to claim 1, further comprising:

a signal processing circuit to separate the selected first IF signals or the second IF signals into video signals and audio signals.

5. A recording apparatus according to claim 1, further comprising:

a first signal processing circuit to separate the first IF signals into video signals and audio signals;

a second signal processing circuit to separate the second IF signals into video signals and audio signals;

wherein said converter converts the video signals and audio signals separated from the first IF signals; and said switching unit outputs signals separated from the first IF signals or the second IF signals.

6. A recording apparatus according to claim 5, wherein said switching unit comprises:

a first switching device for selecting one of video signals output by said first signal processing circuit and said second signal processing circuit; and a second switching device for selecting one of audio signals output by said first signal processing circuit and said second signal processing circuit.

7. A recording apparatus according to claim 6, further comprising:

a signal detection circuit, detecting the second IF signals from said IF converter and controlling operation of said first and second switching devices according to the detection.

8. A recording apparatus according to claim 1, further comprising:

a signal detection circuit detecting the second IF signals inputted by said input terminal and controlling operation of said switching unit according to the detection; and a signal processing circuit separating an output of said switching means into video signals and audio signals.

9. A method of recording TV signals comprising the steps of:

(a) selecting a TV signal from plural channels of inputted TV signals and outputting first IF signals;

(b) converting the first IF signals to RF signals;

(c) outputting the RF signals to a decoder;

(d) receiving decoded RF signals from the decoder at an input terminal;

(e) converting the decoded RF signals received by the input terminal to second IF signals;

(f) selectively changing over and outputting the first IF signals or the second IF signals to a recording unit; and (g) recording the first IF signals or the second IF signals;

wherein a cable box including the decoder does not perform a channel selection operation.

10. A method according to claim 9, further comprising:

(h) detecting the second IF signals; and (i) controlling operation of said step (e) based on an output of said step (h).

11. A method according to claim 9, wherein said step (e) is performed by a tuner.

12. A method according to claim 9, further comprising:

(h) separating the first IF signals or the second IF signals into video signals and audio signals.

13. A method according to claim 12, wherein said step (d) receives video signals and audio signals as the decoded RF signals.

14. A method according to claim 9, further comprising:

(h) separating the selected first IF signals into video signals and audio signals; and (i) separating the second IF signals into video signals and audio signals;

wherein step (e) converting the video signals and audio signals separated from the first IF signals, and step (f) outputting signals separated from the first IF signals or the second IF signals.

15. A method according to claim 14, wherein said step (e) includes the substeps of, (e1) selecting one of video signals output by said step (g) and said step (j); and (e2) selecting one of audio signals output by said step (g) and said step (j).

16. A switching apparatus, comprising:

a tuner, selecting a TV signal from plural channels of inputted TV signals and outputting first IF signals;

a converter converting the first IF signals output by said tuner to RF signals;

an output terminal outputting the RF signals to a decoder;

an input terminal receiving decoded RF signals from the decoder;

an IF converter converting the decoded RF signals received by said input terminal to second IF signals;

a switching unit for selectively changing over and outputting the first IF signals from said tuner or the second IF signals from said IF converters;

wherein a cable box including the decoder does not perform a channel selection operation.

17. A switching apparatus according to claim 16, further comprising:

a signal detection circuit, detecting the second IF signals from said IF converter, and controlling operation of said switching unit according to the detection.

18. A switching apparatus according to claim 16, wherein said I/F converter is a tuner.

19. A switching apparatus according to claim 16, further comprising:

a signal processing circuit to separate the selected first IF signals or the second IF signals into video signals and audio signals.

20. A switching apparatus according to claim 16, further comprising:

a first signal processing circuit to separate the selected first IF signals into video signals and audio signals;

a second signal processing circuit to separate the second IF signals into video signals and audio signals;

wherein said converter converts the video signals and audio signals separated from the first IF signals; and said switching unit outputs signals separated from the first IF signals or the second IF signals.

21. A switching apparatus according to claim 16, wherein said switching unit comprises:

a first switching device for selecting one of video signals output by a first signal processing circuit and a second signal processing circuit; and a second switching device for selecting one of audio signals output by said first signal processing circuit and said second signal processing circuit.

22. A switching apparatus according to claim 21, further comprising:

a signal detection circuit, detecting the second IF signals from said IF converter and controlling operation of said first and second switching devices according to the detection.

23. A switching apparatus according to claim 16, further comprising:

a signal detection circuit detecting the second IF signals inputted by said input terminal and controlling operation of said switching unit according to the detection; and a signal processing circuit separating an output of said switching means into video signals and audio signals.

24. A method comprising the steps of:

(a) selecting a TV signal from plural channels of inputted TV signals and outputting first IF signals;

(b) converting the first IF signals to RF signals;

(c) outputting the RF signals to a decoder;

(d) receiving decoded RF signals from the decoder at an input terminal;

(e) converting the decoded RF signals received by the input terminal to second IF signals; and (f) selectively changing over and outputting the first IF signals or the second IF signals to a recording unit;

wherein a cable box including the decoder does not perform a channel selection operation.

25. A method according to claim 24, further comprising:

(g) detecting the second IF signals; and (h) controlling operation of said step (e) based on an output of said step (g).

26. A method according to claim 24, wherein said step (e) is performed by a tuner.

27. A method according to claim 24, further comprising:

(g) separating the first IF signals or the second IF signals into video signals and audio signals.

28. A recording apparatus according to claim 27, wherein said step (d) receives video signals and audio signals as the decoded RF signals.

29. A method according to claim 24, further comprising:

(g) separating the selected first IF signals or the second IF signals into video signals and audio signals.

30. A recording apparatus for recording TV signals input from a decoder for CATV provided with a scramble decoding function, comprising:

a tuner, selecting a TV signal from plural channels of inputted TV signals and outputting first IF signals;

a converter converting the first IF signals output by said tuner to RF signals;

an output terminal receiving and outputting the RF signals;

a cable box, including a decoder, for receiving the RF signals from said output terminal;

an input terminal receiving decoded RF signals from said decoder;

an IF converter converting the decoded RF signals received by said input terminal to second IF signals;

a switching unit for selectively changing over and outputting the first IF signals from said tuner or the second IF signals from said IF converter to said recording unit; and a recording unit, recording the first IF signals or the second IF signals from said switching unit;

wherein said cable box, including said decoder, does not perform a channel selection operation.

31. A switching apparatus, comprising:

a tuner, selecting a TV signal from plural channels of inputted TV signals and outputting first IF signals;

a converter converting the first IF signals output by said tuner to RF signals;

an output terminal receiving and outputting the RF signals;

a cable box, including a decoder, for receiving the RF signals from said output terminal;

an input terminal receiving decoded RF signals from the decoder;

an IF converter converting the decoded RF signals received by said input terminal to second IF signals;

a switching unit for selectively changing over and outputting the first IF signals from said tuner or the second IF signals from said IF converter;

wherein said cable box, including said decoder, does not perform a channel selection operation.

* * * * *